Dec. 29, 1931.  C. ELFSTEDT  1,838,752

FISH SCALER

Filed April 11, 1930

CARL ELFSTEDT
INVENTOR

PER
Gust Hjelm
ATTORNEY

Patented Dec. 29, 1931

1,838,752

UNITED STATES PATENT OFFICE

CARL ELFSTEDT, OF HUBBARD WOODS, ILLINOIS

FISH SCALER

Application filed April 11, 1930. Serial No. 443,361.

This invention relates to an improved fish scaler, and has for one of its principal objects the provision of means for scaling fish or the like wherein the desired operation can be performed with a minimum expenditure of time and labor, and in a very satisfactory manner.

One of the important objects of this invention is to provide in a fish scaler, a plurality of scraping blades which act in a sequence to each other so far as the surface worked on is concerned, but wherein the operation itself is simultaneous.

Still another important object of the invention is the provision in a fish scaler of a plurality of removable blades which can be readily taken apart for purposes of sharpening, replacement or the like, and which at the same time, when assembled, act as a unitary structure and without any danger of becoming loose or disengaged.

Other and further important objects of the invention will be apparent from the disclosures in the accompanying drawings and following specification.

The invention, in a preferred form, is illustrated in the drawings and hereinafter more fully described.

Figure 1:
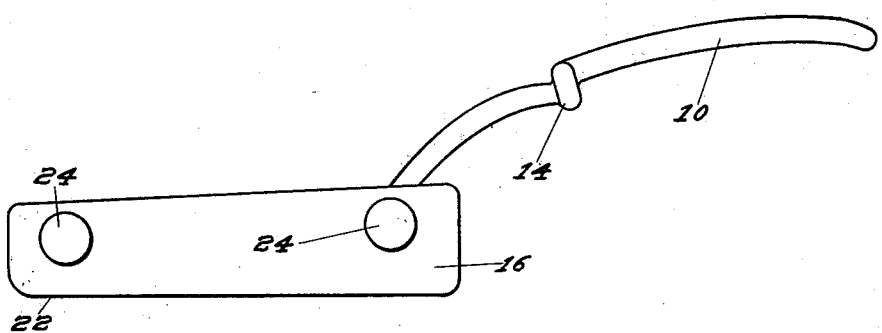
Figure 1 is a side elevation of the improved fish scaler of this invention.

The reference numeral 10 indicates generally the handle of the improved fish scaler of this invention, the handle comprising essentially a U-shaped piece of metal wire or the like, having integral bends 12 and 14 formed therein, the bend 12 being for the purpose of affording a firmer grip upon the handle by the fingers of the operator, and the bend or projection 14 adapted for co-operation with the operator's thumb. Obviously, these lugs and projections may be separate pieces affixed to the handle in any desired or convenient manner.

The fish scaler itself comprises essentially a set of blades 16, 18 and 20 respectively, three being shown in the drawings, but it will be evident that more or less may be employed, if desired.

Each of the blades comprises a substantially rectangular plate as best shown in Figure 1, the lower edge of which is sharpened at 22 to provide a scraping edge, and the blades themselves are mounted and held in desired position by means of bolts or the like 24 passing therethrough, these bolts being screw-threaded at one end and adapted for the reception of winged nuts or the like 26.

Figure 2:
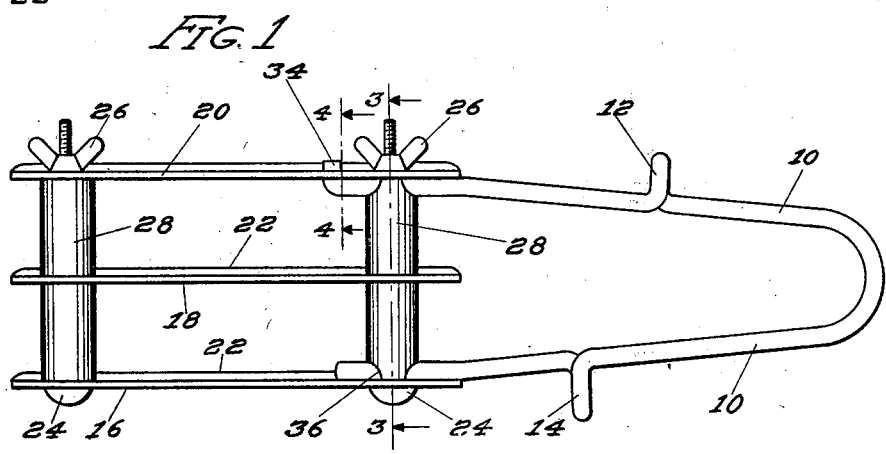
Figure 2 is a top plan view thereof.
Figure 3:
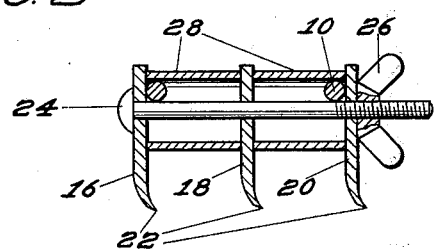
Figure 3 is a sectional view taken on the line 3—3 of Figure 2.

In order to space the blades apart a proper distance from each other, a series of cylindrical spacing members is provided as best illustrated at 28 in Figures 2 and 3, these cylindrical spacing members surrounding the bolts 24 and positioned between the blades.

Figure 4:
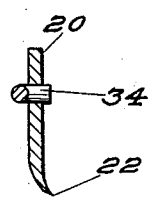
Figure 4 is a detail sectional view on the line 4—4 of Figure 2.

The end of each of the cylindrical spacing members adapted to be positioned on the bolt 24 adjacent to the points of junction between the handle and the plates proper are cut away as shown at 36 in Figure 2 to allow of the passage therethrough of the ends of the handle member. At least one end of the handle member 10 is bent outwardly as shown at 34 in Figures 2 and 4 and passes through a suitable opening formed in the plate 20. This accordingly fixes the handle member in a proper relation to the blades and their supporting and spacing elements. It will be noted that the sharpened edges of the blades 22 are all curved in one direction so as to afford a more satisfactory scraping action, and it will be evident that by the use of this device the scales of the fish can be positively and quickly removed, as a triplicate action results in one operation and at the same time, there can be no clogging whatsoever. Further, the blades may be readily removed for sharpening purposes and the device again re-assembled at a moment's notice.

I am aware that many changes may be made and numerous details of construction varied throughout a wide range without departing from the spirit of this invention, and I, therefore, do not purpose limiting the patent granted hereon otherwise than as necessitated by the prior art.

I claim as my invention:

A fish scaler, comprising a plurality of blades, a supporting frame for the blades, and an operating handle affixed to the frame, integral projections on the handle for co-operation of the fingers and thumb of the operator therewith, the supporting frame comprising the blades themselves, and bolts and nuts passing therethrough to fasten the same together, together with cylindrical spacing members surrounding the bolts and positioned between the blades, certain of said cylindrical spacing members provided with openings for the passage of the ends of the handle therethrough, one end of the handle being bent outwardly at a right angle, and passing through an opening in one blade.

In testimony whereof I affix my signature.

CARL ELFSTEDT.